United States Patent [19]
Schwab

[11] Patent Number: 5,797,167
[45] Date of Patent: Aug. 25, 1998

[54] ELASTIC CORD TIE-DOWN CONSTRUCTION

[76] Inventor: Leonard M. Schwab, 3 Olde Lantern Rd., Acton, Mass. 01720

[21] Appl. No.: 674,174

[22] Filed: Jul. 1, 1996

[51] Int. Cl.$^6$ .................................................. B65D 63/00
[52] U.S. Cl. ........................................ 24/16 R; 24/300
[58] Field of Search ........................ 24/16 R, 16 PB, 24/17 AP, 17 A, 17 B, 115 H, 129 D, 298, 300, 301, 302; 248/499; 410/117, 96, 100, 118, 97, 98, 32, 34, 35, 36, 42, 50, 47

[56] References Cited

U.S. PATENT DOCUMENTS

| 496,696 | 5/1893 | Nash . | |
|---|---|---|---|
| 1,907,629 | 5/1933 | Walty | 24/115 H X |
| 2,728,058 | 12/1955 | Phalen | 248/499 X |
| 2,832,116 | 4/1958 | Clevett, Jr. et al. | 24/129 D X |
| 3,266,464 | 8/1966 | Davis | 24/115 H X |
| 4,885,824 | 12/1989 | Schwab et al. . | |
| 4,974,806 | 12/1990 | Matern | 248/499 |
| 5,003,672 | 4/1991 | Randall | 24/300 |
| 5,317,788 | 6/1994 | Esposito et al. | 24/300 |
| 5,351,367 | 10/1994 | Kennedy et al. | 24/300 X |
| 5,383,259 | 1/1995 | McIntire | 24/300 |

FOREIGN PATENT DOCUMENTS 1045085  11/1953  France .................. 248/499

Primary Examiner—James R. Brittain
Attorney, Agent, or Firm—Barry R. Blaker

[57] ABSTRACT

Disclosed herein is an elastic cord tie-down of the bungee or shock cord type and in which means are provided by which to manually adjust the article-engaging loop of the tie-down to articles of diverse geometries and dimensions.

11 Claims, 3 Drawing Sheets

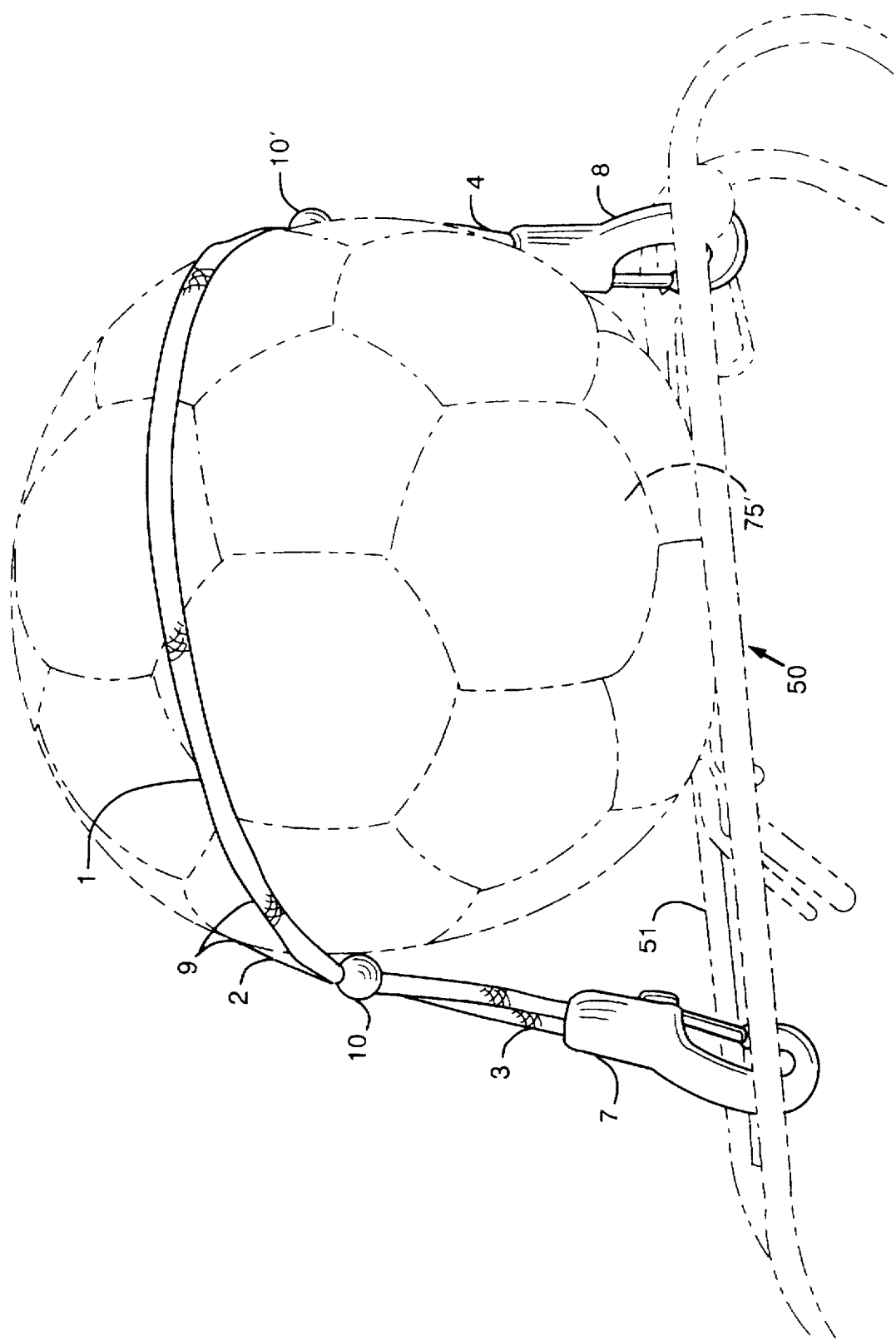

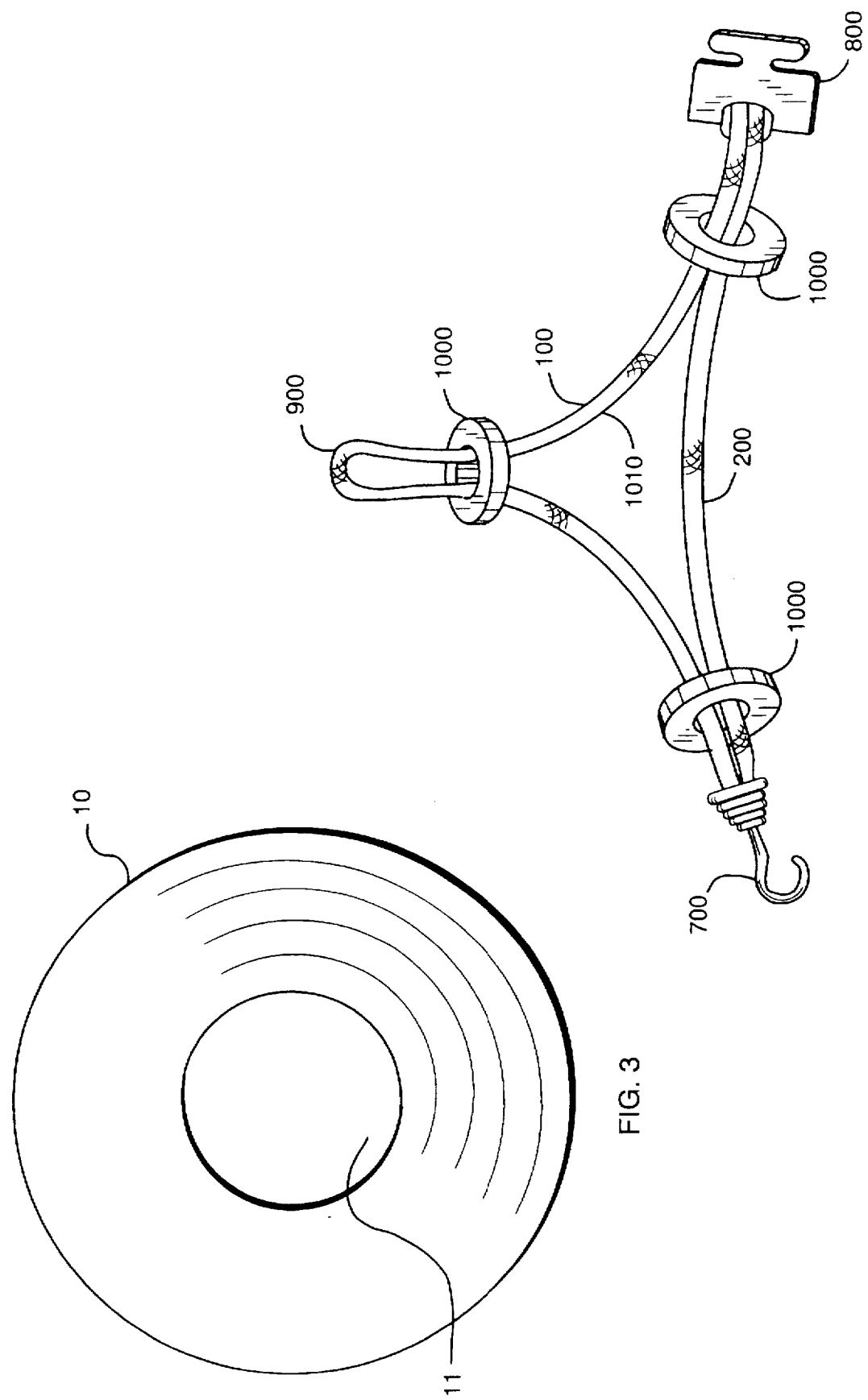

ELASTIC CORD TIE-DOWN CONSTRUCTION

BACKGROUND OF THE INVENTION

The present invention relates broadly to elastic cord tie-down constructions and is more particularly directed to such tie-down constructions wherein a pair of elastic cords, defining therebetween an article-engaging loop, is provided with means by which adjustment of the loop to the dimensions and geometry of the particular article to be secured thereby is facilitated.

In general, elastic cord tie-down constructions are well known. In its simplest form such tie-down constructions comprise a single length of an elastic cord, commonly known as a "bungee" or "shock" cord, and to the respective ends of which length of cord some sort of attachment element, such as a hook, ring, loop or key element, is affixed so as to cooperate with anchor points forming part of a support structure to which articles or packages are to be secured. These attachment elements, when attached to the anchor points of the support structure, place the elastic cord element in sufficient tension as to enable the entrapment of the article to be secured thereunder, thereby securing the article to the structure. Common applications to which such elastic cord tie-down constructions are put are those used in association with vehicular cargo and article support structures, such as bicycle and motorcycle racks, boat racks, aircraft cargo bays, automotive roof and trunk racks, truck beds and cargo racks associated with such recreational vehicles as skimobiles and so-called "ATV" or all-terrain-vehicles. However, the utility of such elastic tie-down constructions is not limited to vehicular applications and they also find substantial applicability in temporarily securing diverse articles, particularly elongate articles such as fishing rods, skiis, dimension lumber, panels, ladders, pipe and the like to static structures, such as to the walls or ceilings of buildings. Accordingly, the specific tie-down applications to which elastic cord tie-down constructions may be put are very broad in range and are constrained substantially only by the imagination of the user and the specific physical needs of the tie-down application entertained.

As mentioned, the elastic cord element(s) utilized in elastic cord tie-down structures normally comprise one or more "bungee" or "shock" cord elements. One type of such bungee or shock cord element broadly comprises an elastomeric core element composed of one or more elongate strands of natural or synthetic rubber, said core or strands being bundled together or covered with a braided fabric sheath which may be composed of natural, synthetic or blends of natural and synthetic fibers such as cotton, polyester, cotton-polyester, polyolefins such as polypropylene, polyamides such as NYLON, ester and ether based polyurethanes and the like. Another bungee type elastic cord element of commerce does not comprise the aforementioned fabric sheath and instead consists simply of a bare single elongate strand composed of an elastomeric material. Such "bungee" or "shock" cord constructions are commercially available in a wide range of diameters and stretch characteristics from various domestic manufacturers such as: Hope Webbing Company, Pawtucket, Rhode Island, and Thomas Taylor & Sons, Inc., Hudson, Mass. It is in the nature of things that these elastic cord elements in a tie-down construction have the capacity to be stretched between the anchoring points of the support structure, thereby to beneficially apply the resulting forces of restitution generated therein for the entrapment of the article and for the securing of same to the support structure. It is also in the nature of things that the diameter of the elastic cord element is reduced as a function of its stretching, the greater the degree of stretch the greater being the reduction in its diameter.

In my U.S. Pat. No. 4,569,108, issued Feb. 11, 1986 and entitled CLOSED LOOP-HOOK AND ELASTIC BAND FASTENER, there is disclosed an improved wire hook-loop attachment element for elastic cord tie-down constructions wherein said hook-loop attachment element demonstrates improved properties. The elastic cord of the construction is disclosed to be in the form of a loop, at least one end of which is removably affixed to a rigid wire loop hook by means of a pull-through knot. Thus, the elastic cord loop arrangement of this construction comprises a pair of elongate elastic cord elements which when placed in tension, extend from the hook-loop attachment element in contacting, parallel, planar alignment with each other.

In U.S. Pat. No. 4,885,824, issued Dec. 12, 1989, to Schwab et al., entitled ADJUSTABLE TENSION FASTENER, there is disclosed another elastic cord tie-down construction wherein the elastic cord arrangement is in the nature of a continuous loop and wherein, in substance, the tensioned or article-engaging portion of the loop comprises a pair of elastic cord elements. The construction includes at least one rigid loop-hook attachment element one end of the elastic cord loop being attached to the loop member of the attachment element by means of a pull-through knot. The elastic cord loop comprises a tension or article-engaging portion and a slack reserve portion. The reserve portion lies externally of the tension portion and thus is not tensioned and serves no article-engaging function in use of the construction. Located proximate the pull-through knot is a retainer or binder member having a hole through which the reserve portion of the elastic cord loop is received, said hole being of a size such that the reserve portion of the elastic cord loop is enabled to slip therethrough when placed into a stretched state while being securely and frictionally captured therein when said reserve portion is released from its stretched condition and the diameters of the paired elastic cords thereof recover. Thus, by adjustment of the length of the reserve portion extending through the retainer or binder member, the tie-down construction of this patent provides the user with the capability to adjust the overall length and tension exerted by the tension portion of the paired elastic cord elements.

The inventions of the foregoing patents have advanced the art of elastic cord tie-down constructions. Firstly, tie-down constructions comprising paired elastic cord elements acting in concert (as opposed to the single elastic cord elements of the prior art) lead to improved security of fixation of articles to underlying support structures and to fail-safe benefits due to the redundancy of the elastic cord elements thereof. However, the inventions of the above-cited patents do not address the problem of providing means by which the article-engaging portion of the elastic cord loop can be adjusted to secure capture of articles of diverse dimensions and/or geometries, particularly those having curvilinear or arcuate surfaces, such as soccer balls and the like. Accordingly, there remains a need to provide the user with a suitable arrangement by which the article-engaging loop portion of a paired elastic cord tie-down construction can be suitably adjusted so as to enable facile and secure engagement of the article to be secured thereby. In accordance with the present invention, that need has been fulfilled.

OBJECTS OF THE INVENTION

It is a principal object of the invention to provide a novel elastic cord tie-down construction.

3

It is another object of the invention to provide an elastic cord tie-down construction comprising paired elastic cord elements wherein the article-engaging loop portion defined between said cord elements may be readily user-adjusted to the shape and dimensions of the particular article or articles to be secured thereby.

It is still another object of the invention to provide an elastic cord tie-down construction comprising paired elastic cord elements wherein the article-engaging loop portion defined between said cord elements may be readily user-adjusted so as to securely capture articles having curvilinear or arcuate surfaces.

Other objects and advantages of the invention will, in part, be obvious and will, in part, appear hereinafter.

SUMMARY OF THE INVENTION

The tie-down construction of the present invention broadly comprises at least one pair of elongate stretchable elastic cord elements, the respective end portions of which cord elements have attachment means for securing the tie-down construction to a support structure and the portion of said pair of elastic cord elements between said attachment means defining an article-engaging loop. Circumscribing each said pair of elongate elastic cord elements of said article-engaging loop is at least one keeper element composed of an elastomeric material and having a bore therethrough to receive said pair of cord elements. Each said elastomeric keeper element is of sufficient resiliency such that the bore thereof maintains slideable frictional engagement with and biases the article-engaging portion of said pair of cord elements together over an at least substantial range of stretch thereof. Thus, said pair of elastic cord elements, in conjunction with said at least one keeper element, together define an adjustable article-engaging loop whereby said elastic cord elements may be suitably adjusted to accommodate articles of diverse dimensions and geometries.

BRIEF DESCRIPTION OF THE DRAWINGS

FIG. 2 is a schematic, diagrammatic, perspective view of the embodiment of the elastic cord tie-down construction of the invention of FIG. 1 shown securing a spherical article to said bicycle rack.

FIG. 3 is a schematic, diagrammatic end view of a keeper element of preferred geometry in the elastic cord tie-down construction of the invention.

FIG. 4 is a schematic, diagrammatic, plan view of another embodiment of the elastic tie-down construction of the invention depicting several alternative elements and arrangements thereof.

DESCRIPTION OF PREFERRED EMBODIMENTS

Figure 1:
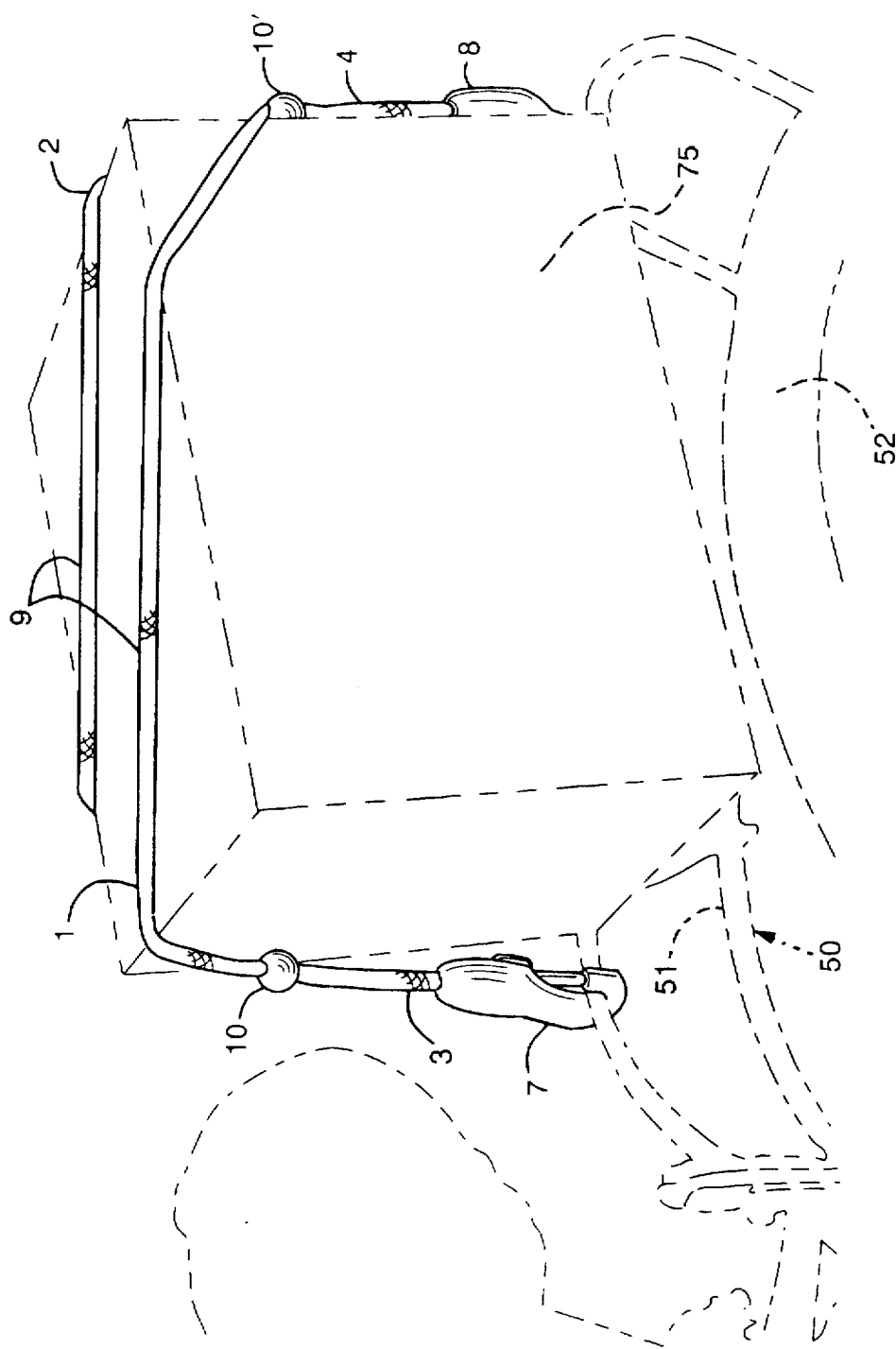
FIG. 1 is a schematic, diagrammatic, isometric view of one embodiment of the elastic cord tie-down construction of the invention shown securing an oblong article to an associated support structure in the nature of a bicycle rack.

Referring now to FIGS. 1 through 3, wherein like reference numerals refer to like structures, there is shown a support structure 50 in the nature of a bicycle rack 51 composed of formed and welded metallic members and which rack 51 is affixed over the rear wheel 52 of a bicycle. The specific elements and construction of the support structure 50 form no part of the present invention and the bicycle rack 51 shown in FIGS. 1 and 2 is merely exemplary of one

4 type of support structure to which the elastic cord tie-down construction of the invention may be beneficially applied.

The elastic cord tie-down construction of the invention broadly comprises at least one pair of elongate stretchable elastic cord elements 1 and 2 having end portions 3 and 4 which are affixed to attachment elements 7 and 8, respectively. Preferably, each of said elastic cord elements 1 and 2 is of the type having a braided fabric covering or sheath thereover, as previously described. That portion of the pair of elastic cord elements 1 and 2 intermediate said attachment elements 7 and 8 defines an article-engaging loop 9 which is rendered adjustable over its length by means of at least one keeper element 10 and preferably a pair of keeper elements 10, 10', each said keeper element being composed of an elastomeric material and having a bore 11 sized to slideably and frictionally receive and engage said elastic cords 1 and 2. Each said keeper element 10 and/or 10' is of sufficient resiliency such that its bore maintains said slideable and frictional relationship when the cords 1 and 2 are tensioned, thereby to clasp said pair of cords in adjacent relationship at the selected location of the keeper element when said cords are in the stretched, article-engaging condition thereof. In a preferred embodiment of the invention the construction comprises a pair of elastic cord elements 1 and 2 defining an article-engaging loop 9 between a pair of attachment elements 7 and 8 and a pair of keeper elements 10, 10' disposed over the article-engaging loop 9. In this preferred embodiment the article-engaging loop 9 is thus rendered adjustable from both ends thereof, thereby maximizing the ability of the user to best adjust the loop to the dimensions and geometry of the particular article or load to be secured thereunder. In FIG. 1 the attachment elements 7 and 8 are affixed to suitable members of the bicycle rack 51 and the loop 9 disposed over an article 75 of oblong geometry, thereby stretching the elastic cord elements 1 and 2 and placing the article-engaging loop 9 in tension. The loop 9 is shown to be adjusted by means of the keeper elements 10, 10' such that said loop 9 engages diagonal corners of said article 75. In FIG. 2, the article 75' is spherical in geometry, such as in the nature of a soccer ball, and the keeper elements 10, 10' are each adjusted over the lengths of the pair of tensioned elastic cords 1 and 2 such that the resulting article-engaging loop 9 securely engages the arcuate surface of the spherical article 75'.

It is, of course, the role of the attachment elements of the present invention to affix the construction to anchoring points of the support structure. Thus, depending somewhat upon the nature of the particular support structure to which the elastic cord tie-down construction is to be affixed, said attachment elements may take many forms, such as hooks, rings, key elements or even loops formed of the elastic cord elements themselves. While the attachment elements 7 and 8 of the construction of FIGS. 1 and 2 are each in the nature of hook elements, alternative attachment elements are also generally suitable. For instance, as shown in the embodiment of the invention shown in FIG. 4, the attachment elements may be in the nature of a hook 700, a sheet metal key element 800 which is shaped to cooperate with a receiving slot in the support structure or even an external loop 900 formed from one or another of the elastic cord elements 100 and 200 of the construction. While not shown in FIG. 4, it will be obvious that the elastic cord element 100 from which the loop 900 is formed, may be knotted exteriorly of the keeper element 1000 associated therewith, such as by means of an overhand knot, thereby to act as a stop for said keeper element 1000 and to prevent inadvertent loss thereof. In general, I have found hook type attachment elements to have broad applicability to many of the types of support structures to which the construction of the invention may typically be put. The hooks of interest can be formed of metal, such as the wire closed loop-hook disclosed in my U.S. Pat. No. 4,569,108; cast or forged metallic hooks, or may be formed of a tough durable plastic, such as those commercially available from ITW/Nexus, Wood Dale, Ill.

The keeper element(s) constitute an essential element in the construction of the invention. As mentioned previously, each said keeper element is composed of a resilient elastomeric material and has a bore sized to slideably and frictionally receive and engage the pair of elastic cord elements therethrough such that said keeper element is enabled to clasp said pair of elastic cord elements in adjacent relationship throughout at least a substantial range of stretch thereof and at the selected location of the keeper element along the lengths thereof. Accordingly, the specific geometry of each said keeper element is subject to considerable variation, such as in the geometry of a grommet, washer, O-ring, sleeve, tube and the like. For instance, in the embodiment of the invention shown in FIG. 4, the keeper elements 1000 are washer-shaped. However, as particularly shown in FIGS. 1 through 3 hereof, I generally prefer that each said keeper element 10 of the construction be in the geometric form of a sphere or bead 10, having a single centrally located bore 11 therethrough. The elastomeric material of which the keeper element is composed may be of natural rubber, synthetic rubbers such as polybutadiene, polyisoprene, neoprene or polyurethane, and the like, or, preferably, of a thermoplastic rubber (TPR). Such thermoplastic rubbers, including generally such TPRs as the polyurethane and polyester elastomers, constitute a preferred embodiment of the keeper element(s) of the invention. Said TPR thermoplastic rubber compositions are generally readily and precisely formable into the keeper element(s) of the present invention by such techniques as extrusion, compression and/or injection molding. Moreover, said TPR compositions are generally formable into highly durable and adequately resilient keeper elements of the present invention without the need for the presence or addition of adjuvant curatives therein and/or post-forming vulcanizing steps applied thereto. I have found particularly suitable for use in forming and using the keeper element(s) of the invention thermoplastic rubber compositions (TPRs) manufactured and sold under the trademark, KRATON, by Shell Chemical Company, Houston, Tex. Such thermoplastic rubber compositions have been found to be durable under the typical environmental conditions of use of the present invention, have low creep characteristics and are available in a broad range of resiliencies and hardnesses.

In FIG. 4 there is shown a plan view of an alternative construction in accordance with the construction of the invention and in which three attachment elements 700, 800 and 900 are associated with a pair of elastic cord members 100 and 200, respectively. As will be noted therefrom, the resulting three-sided article-engaging loop 1010 is defined between a relatively short elastic cord element 200 and a relatively longer elastic cord element 100. The relatively longer 100 of the pair of cord elements comprises an attachment element 900 located intermediate the end portions thereof, as well as attachment elements 700 and 800 connecting the respective end portions of said cord element 100 with like end portions of the cord element 200. Thus, unlike the generally parallel two-element loop 9 defined in the tie-down construction of FIGS. 1 and 2, the article-engaging loop 1010 of the tie-down construction of FIG. 4 defines a generally triangular or three-sided web composed of three individual and spaced apart segments of the pair of elastic cord members 100 and 200. Moreover, the three keeper elements 1000 of this construction provide the capability to individually adjust each of said segments of said three-sided web to the particular article or cargo engaged thereby. As will be appreciated by those of ordinary skill in the art to which this invention pertains, the tie-down construction of the invention can be prepared with substantially any number of individual segments of the elastic cord tie-down elements defining the article-engaging web thereof.

While the foregoing description demonstrates certain embodiments of the invention and techniques for the implementation and use thereof, it should be recognized and understood that said description is not to be construed as limiting of the invention because many obvious changes, modifications, variations and substitutions of equivalents may be made therein without departing from the essential scope, spirit or intention of the invention. For instance, while each keeper element 10, 10' of FIGS. 1 through 3 has been previously described in a preferred embodiment as having a single bore to receive the pair of elastic cord elements 1 and 2 therethrough, thereby to facilitate assembly of the invention, it is obvious to one of ordinary skill in the art that said keeper elements may also be conformed with multiple bores of appropriate sizes as to individually receive the elastic cord elements of each pair thereof. Moreover, the one or more pairs of article-engaging elastic cord elements forming part of the tie-down construction of the invention may extend exteriorly of one or more of the attachment elements associated therewith and said exteriorly extending portions of said elastic cord elements may be equipped with means to adjust the overall length and tension of the article-engaging loop(s) defined between said attachment elements, such as in accordance with the adjustable tension fastener disclosed in my U.S. Pat. No. 4,885,824. Accordingly, it is intended that the invention is to be limited only by the scope of the appended claims.

What is claimed is:

1. An elastic cord tie-down construction comprising:
   at least one pair of elongate stretchable elastic cord elements having end portions;
   each said end portion having an attachment element for securing said tie-down construction to a support structure therefor and that portion of said pair of elastic cord elements between said attachment elements defining an article-engaging loop therebetween;
   at least one keeper element composed of a resilient elastomeric material and having a bore to receive said pair of elongate stretchable elastic cord elements therethrough, said bore being of a size such that said keeper element is in slideable frictional engagement with said pair of elastic cord elements defining said article-engaging loop and the resiliency of said keeper element being sufficient to maintain the bore thereof in said slideable and frictional engagement with said pair of elastic cord elements and to clasp said pair of cord elements in substantially adjacent relationship over at least a substantial range of stretching thereof.

2. The elastic cord tie-down construction of claim 1 comprising a pair of said elastic cord elements.

3. The elastic cord tie-down construction of claim 2 comprising a pair of said keeper elements.

4. The elastic cord tie-down construction of claim 1 wherein each said keeper element is in the geometric form of a sphere.

5. The elastic cord tie-down construction of claim 1 wherein each said keeper element has a single bore therethrough to receive said at least one pair of elastic cord elements.

6. The elastic cord tie-down construction of claim 1 wherein the elastomeric material of each said keeper element is a thermoplastic rubber.

7. The elastic cord tie-down construction of claim 1 wherein each said attachment element is in the nature of a hook.

8. The elastic cord tie-down construction of claim 7 wherein each said hook attachment element is formed of metal.

9. The elastic cord tie-down construction of claim 8 wherein each said hook attachment element is formed of wire.

10. The elastic cord tie-down construction of claim 7 wherein each said hook attachment element is formed of plastic.

11. The elastic cord tie-down construction of claim 1 wherein each said cord element comprises a braided fabric sheath thereover.

* * * * *